United States Patent Office 3,535,650
Patented Oct. 20, 1970

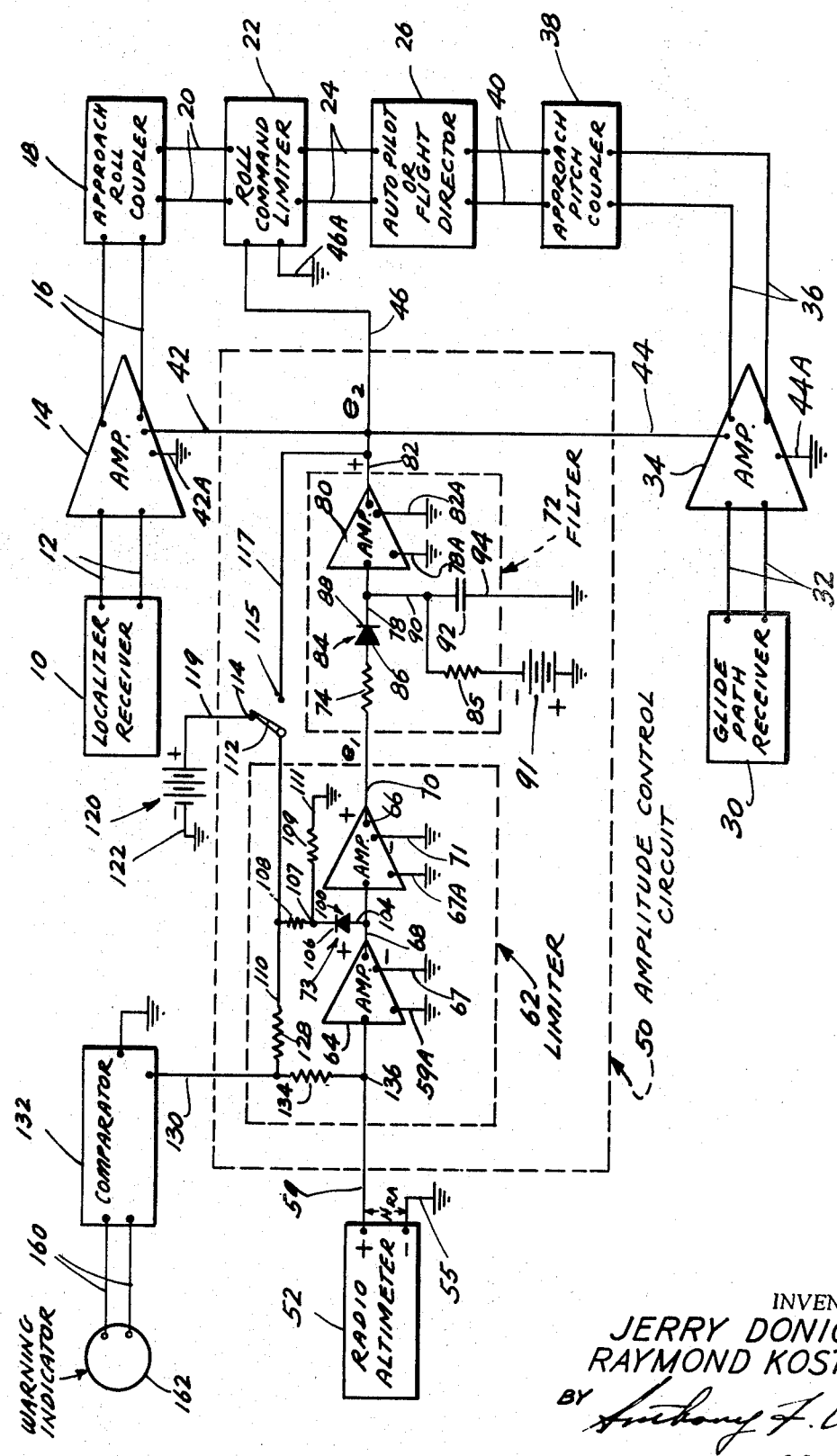

3,535,650
AMPLITUDE CONTROL NETWORK
Jerry Doniger, Montvale, and Raymond Kostanty, Jersey City, N.J., assignors to The Bendix Corporation, a corporation of Delaware
Original application Mar. 4, 1965, Ser. No. 437,061, now Patent No. 3,335,980, dated Aug. 15, 1967. Divided and this application Jan. 16, 1967, Ser. No. 609,519
Int. Cl. H03g *11/02;* H03f *4/08*
U.S. Cl. 330—135                                3 Claims

ABSTRACT OF THE DISCLOSURE

An amplitude control network for preventing, partially or completely, an output signal from following increasing input signals and including means providing time lag constants and rate limiting so arranged as to prevent excessively fast changes in the output signal in response to rapidly decreasing input signals.

CROSS REFERENCE TO RELATED APPLICATIONS

The present application is a division of U.S. application Ser. No. 437,061, filed Mar. 4, 1965, by Jerry Doniger and Raymond Kostanty, and assigned to The Bendix Corporation, assignee of the present invention.

BACKGROUND OF THE INVENTION

Field of the invention

Instrument landing systems utilized in commercial and military approaches of an aircraft to a landing runway operate in response to beam error signals effective at a glide path receiver and localizer receiver carried by the aircraft to generate electrical control signals proportional to the vertical path and horizontal course angular error of the aircraft in flight from a preset line in space which may be inclined from the horizontal by, for example, a nominal three degrees to provide a descent path terminating on the runway. The absolute position of the course path line is usually not known nor is the distance of the aircraft to the runway.

In such systems, approach couplers may operate through an automatic pilot or flight director system so as to utilize guidance beam error signals to guide the aircraft to the runway. It has been found, however, that as the distance to the runway decreases the indicated beam error increases for a given vertical or horizontal offset. It has been concluded from such discovery that there is a general increase in the gain of the coupler system as the runway is approached in the landing of the aircraft. In recognition of this change in the gain of the coupler system, such coupler systems have heretofore been so arranged so to decrease the gain thereof as the runway is approached in an attempt to match the increase in the gain of the coupler system due to the converging geometry of the transmitted beams.

Description of the prior art

Several techniques have been used in the past to provide this matching effect, including the following:

(1) Use of constant gains which degrade performance in the early portion of the approach of the aircraft for effecting an improved performance of the aircraft at the later stages of the flight near the runway.

(2) Use of discrete gain switching as a function of the time to go to the runway so as to assure an initial average time to the runway when the descent begins. However, here again only compromises can be accomplished in generating the proper gain program.

(3) The use of means for clutching into operation a barometric pressure altitude responsive means at a preselected nominal altitude of the aircraft, to program the gain of the landing system so that the gain is nominally correct at low altitudes in approaching the runway. Off nominal initial altitude conditions have been found, however, to degrade the performance of the landing system at low altitudes.

(4) The use of barometric pressure altitude prevailing in the aircraft at the level of flight and at the runway so as to effectively program the gain of the landing system which requires a presetting of both the runway elevation and pressure correction in the aircraft prior to descent of the aircraft to the runway.

SUMMARY OF THE INVENTION

The novel arrangement of the present invention provides the desired matching effect without the aforenoted disadvantages. An input signal from a radio altimeter is applied through limit and lag circuits so as to provide an output signal which lags the input signal, but which may be proportional thereto, together with novel means for setting the limiter in response to the output signal so that as the input signal is reduced the limiter will be set by the output signal so as to permit the passage of an input signal of approximately the same voltage. The arrangement is such, however, that if there is a momentary increase in the input signal, the limiter will be so reset by the lagging output signal as to end to limit the input signal so as to prevent, partially or completely, the output of the limiter from following the resulting increase in the input signal. On the other hand, if the input signal momentarily decreases more rapidly and the output signal of the limiter in this case would be less than that for the previous input, whereupon the lag circuit would follow this reduction within preset rate limits. Thus, through the aforenoted arrangement increases in the input signal may be rejected while the effects of rapid reductions in the input signal may be effectively attenuated.

One object of this invention is to provide means for controlling the amplitude of an input signal so that increases in the input signal are rejected while the effects of rapid decreases in the input signal may be effectively attenuated.

Another object of this invention is to limit the input signal so as to provide an output signal which follows a decreasing input signal but is held under increasing input signals to a value equivalent to the last minimum value of the input signal until the last input signal falls below said last minimum value.

Another object of this invention is to provide means responsive to the output signal for setting the limiter so that the output signal follows the decreasing input signal within predetermined rate limits.

Another object of this invention is to set the limiter in response to the output signal so as to permit passage of an input signal of approximately the same voltage as the output signal.

Another object of this invention is to provide means for resetting the limiter to a predetermined maximum input signal condition.

These and other objects and features of the invention are pointed out in the following description in terms of the embodiment thereof which is shown in the accompanying drawing. It is to be understood, however, that the drawing is for the purpose of illustration only and is not a definition of the limits of the invention, reference being had to the appended claims for this purpose.

DESCRIPTION OF THE DRAWING

The single figure in the drawing is an electrical schematic diagram of an amplitude control circuit embodying the present invention and shown in cooperative relation with an altitude responsive aircraft landing system.

AMPLITUDE CONTROL CIRCUIT

Referring to the figure, there is indicated by the numeral 10 a conventional localizer beam receiver for controlling the flight of an aircraft in a landing operation. The localizer beam receiver 10 is operatively connected through suitable electrical output conductors 12 to the input of a conventional variable gain amplifier 14 having output conductors 16 connected to the input of a conventional approach roll coupler 18.

The approach roll coupler 18 is in turn connected through output conductors 20 to the input of a roll command limiter 22 having output conductors 24 leading to an input of an autopilot or flight director 26 for controlling the roll of an aircraft about a roll axis thereof in a conventional manner. The localizer beam receiver 10 provides suitable control signals in response to horizontal coures angular errors sensed thereby in a conventional manner from present lines or converging beams in space transmitted from suitable ground based transmitting equipment which also may be of a conventional type.

There is similarly provided a glide path beam receiver 30 of conventional type arranged to generate electrical output signals which are proportional to the vertical path course angular errors from a preset line or glide path beam in space, and which may be transmitted from suitable ground based transmitting equipment and inclined from the horizontal by, for example, a nominal three degrees to provide a descent path terminating on the runway.

The glide path beam receiver 30 is operatively connected through suitable electrical output conductors 32 to the input of a conventional variable gain amplifier 34 having output conductors 36 connected to the input of a conventional approach pitch coupler 38.

The approach coupler 38 is in turn connected through output conductors 40 to the input of the autopilot or flight director 26 for controlling the pitch of the aircraft about a pitch axis thereof in a conventional manner. The glide path beam receiver 30 provides suitable control signals in response to course angular errors from the glide path beam sensed thereby.

The variable gain amplifiers 14 and 34 and the roll limiter 22 are operatively connected by output conductors 42, 44 and 46, respectively, leading from an amplitude control circuit 50, shown diagrammatically in the figure, so as to be controlled by an input signal applied therethrough by a radio altimeter 52, as modified by the operation of the amplitude control circuit 50, as hereinafter explained in greater detail.

The radio altimeter 52 may be of a conventional type carried by the aircraft in flight and arranged to provide a direct current output signal $H_{RA}$ across conductors 55 and 59 proportional to the altitude of the aircraft above the terrain. The conductor 55 carrying a negative charge may be connected to a common ground, while the conductor 59 having a positive potential is connected to an input of the amplitude control circuit 50.

The radio altimeter 52 is so arranged that the magnitude of the direct current signal $H_{RA}$ applied across the conductors 55-59 is decreased with the sensed altitude as the aircraft descends to the runway to provide at the output conductors 42, 44 and 46 of the amplitude control circuit 50 a positive output signal voltage $e_2$ proportional to the signal $H_{RA}$ and which decreases in magnitude with such sensed altitude so as to in turn decrease the gain of the variable gain amplifier 14 connected between the localizer receiver 10 and the approach roll coupler 18 and decrease the gain of the variable gain amplifier 34 connected between the glide path receiver 30 and the approach pitch coupler 38, with the decrease in the sensed altitude as well as resetting the roll limit of the roll command limiter 22 in a roll command restricting sense with such decrease in the sensed altitude.

The amplitude control circuit 50 disclosed herein and responsive to the direct current altitude signal $H_{RA}$ applied across the lines 55-59 by the radio altimeter 52 is arranged to provide a gain program without any presetting by the pilot and to provide correct gain at low altitudes irrespective of the initial altitude of the landing approach by the aircraft.

In the implementation shown in the figure, the direct current signals of the amplitude control circuit 50 at the respective output lines 42, 44 and 46 will follow the altitude responsive direct current input signal $H_{RA}$ applied to the input line 59 only for sensed decreasing input altitude signals, while the electronic desensitization means 50 will hold the output signals at lines 42, 44 and 46 to the last minimum value of the sensed input altitude signal until the sensed input signal falls below that last minimum sensed altitude value and in this respect the operation of the amplitude control circuit 50 is analogous to the operation of a ratchet in effecting such change only in an altitude decreasing sense. Moreover, the output signal applied at the lines 42, 44 and 46 lags the altitude input signal at conductor 59 by a preset time constant and the output is further rate limited so that very rapid reductions in the sensed input radio altitude signal at the line 59 is followed at a fixed rate.

In effecting the aforenoted mode of operation, the amplitude control circuit 50 receives a direct current output signal from the radio altimeter 52 proportional to the prevailing altitude of the aircraft above the terrain and indicated by the symbol $H_{RA}$ and which signal has a positive potential applied through conductor 59 to the input of a limiter circuit 62, including a first stage direct current operational amplifier 64 connected to the input conductor 59 and having a grounded input conductor 59A as well as a positive output conductor 68 and a negative grounded output conductor 67, together with a second stage direct current operational amplifier 66 connected to the conductor 68 and having a grounded input conductor 67A as well as a positive output conductor 70 and a grounded negative output conductor 71. Both of the amplifiers 64 and 66 are of conventional direct current amplifier types. The amplifier 64 provides at the output conductor 68 a positive output signal voltage applied through the conductor 68 extending from the output of the amplifier 64 to the input of the amplifier 66. The second stage amplifier 66 provides at the output conductor 70 a positive output voltage $e_1$ with the conductor 70 leading to a filter circuit 72. The limiter 62 includes a circuit 73 for controlling or setting the limit thereof controlled by a positive voltage $e_2$ at the output of the filter circuit 72, as hereinafter explained.

The filter circuit 72 includes resistor element 74 connected to the conductor 70 with the resistor element 74 connected through a diode device 84 to a conductor 78. The diode 84 has unidirectional current conduction characteristics and an anode element 86 connected to resistor 74 and a cathode element 88 connected to conductor 78. The diode 84 is arranged so as to be conductive of current flow from resistor 74 to conductor 78 while preventing current flow in a reverse direction from conductor 78 to resistor 74, except, of course, in the event the diode 84 is not sufficiently back biased to cut it off, as hereinafter explained.

The conductor 78 is connected to the input of a conventional type direct current amplifier 80 including an opposite grounded input 78A and having an output conductor 82 providing a positive potential output voltage $e_2$ and a negative output line 82A connected to a common ground. There is also provided a resistor 85 connected at one end through a conductor 90 to the conductor 78 and at an opposite end to a negative terminal of a battery or suitable source of electrical energy 91 having a positive terminal connected to a common ground. Further, there is provided a capacitor 92 having one plate connected to the conductor 90 and an opposite plate connected through a conductor 94 to the common ground and thereby to the grounded input conductor 78A of the direct current amplifier 80.

The filter 72 is arranged to provide a lag and rate limit circuit whose positive output $e_2$ at the line 82 lags the signal $e_1$ at the conductor 70. Further, the lagging effect of the filter circuit 72 also operates as a result of an action of the diode 84 in such a way that the voltage applied across the capacitor 92 can change at a rate up to a fixed value set by the voltage applied across the diode 84.

Thus, as the voltage $e_1$ *decreases,* at a predetermined normal rate, in response to the radio altimeter signal $H_{RA}$ as the aircraft nears the ground, the voltage across the capacitor 92 is allowed to follow the normal rate of decrease of $e_1$, since the diode 84 is so arranged that under such normal decreasing rate of voltage $e_1$ the diode 84 is not back biased sufficiently to cut it off so that the positively charged plate of the capacitor 92 in such case may discharge by a reverse flow of current through conductors 90 and 78, diode 84 and resistor 74 as well as through resistor 85 to the negative terminal of battery 91, and thus making the discharging time $\tau_{D_1}$ of the capacitor 92 equal to $$C_{92}\left(\frac{R_{74}R_{85}}{R_{74}+R_{85}}\right)$$

However, when the voltage $e_1$ decreases more rapdily than the predetermined normal rate, as when the aircraft passes over a hill, the positively charged plate of the capacitor 92 is prevented from discharging at such more rapid rate and through the diode 84 by the operation of the diode 84 which is now back biased sufficiently to cut it off. The capacitor 92 can then only discharge through the resistor 85 and at a time constant $\tau_{D_2}=C_{92}R_{85}$, which is arranged to be much slower than the normal discharge time constant $\tau_{D_1}$. In effecting these time constants, the arrangement is such that the amplifier 66 has a very low output impedance while the amplifier 80 has a very high input impedance. The capacitor 92 can only discharge to the voltage $e_1$, since the diode 84 becomes forward biased if it discharges further. This forward biasing would recharge the capacitor to the value of $e_1$.

The gain of the filter 72 is so set as to provide an output voltage $e_2$ at the output line 82 which is proportional to the radio altimeter signal $H_{RA}$ applied at the line 59 and which is applied to the lines 42-42A and 44-44A through the output conductor 82 and grounded conductor 82A so as to drive the variable gain amplifiers 14 and 34, respectively, for the approach couplers 18 and 38 of the autopilot or flight director 26 so as to provide the desired program action in accordance with the radio altimeter signal. This output voltage $e_2$ applied to the lines 82-82A and thereby also to the lines 46-46A leading to the roll command limiter 22 is such as to set the roll command limiter 22 to the prescribed value for the effective sensed altitude above the terrain.

The limiter 62 includes the circuit 73 for setting the limit thereof in which there is provided a diode device 100 having unidirectional current conduction characteristics and an anode element 102 connected through a conductor 104 to the conductor 68 connecting the positive output and input of the amplifiers 64 and 66, and a cathode element 106 connected to a point 107 intermediate a resistor 108 and a resistor 109. The resistor element 108 is connected at an opposite end to a conductor 110, while the resistor element 109 has a opposite end connected to ground by a conductor 111. The diode 100 is so arranged as to be conductive of current flow from conductors 68 and 104 to point 107 while preventing a current flow in a reverse direction from point 107 to conductors 104 and 68.

The conductor 110 is connected at one end to a switch arm 112 which may be operated by the pilot so as to selectively close a switch contact 114 and a second switch contact 115. The switch contact 115 is connected through a conductor 117 to the output conductor 82 leading from the amplifier 80 of the filter circuit 72, while the switch contact 114 is connected through a conductor 119 to the positive terminal of a battery 120 having a negative terminal connected through a conductor 122 to a common ground.

The conductor 110 is also connected to a resistor 128 connected to a conductor 130 leading to the input of a camparator 132. Also leading to the input conductor 130 is a second resistor 134 leading through a conductor 136 from the input conductor 59. The resistors 128 and 134 provide a summing resistor arrangement whereby the feedback signal applied through the conductor 110 is algebraically summed with the input signal applied through the resistor 134 from the input conductor 59 so that the comparator 132 may sense a predetermined difference therein, as hereinafter explained.

Moreover, upon the switch 112 being adjusted by the operator to a downward position so as to open switch contact 114 and to close the switch contact 115 for operation during normal approach of the aircraft to the landing runway, it will be seen that the positive output voltage $e_2$ applied then through the feedback conductor 117, contact 115, switch arm 112, and conductor 110 is applied through the resistor 108, resistor 109, and conductor 111 to ground. The voltage across resistor 109 biases the diode 100 so as to set the limiting value of the input limiter 62.

Thus, as the aircraft descends on an approach to the runway, the voltages $H_{RA}$ and $e_1$ and $e_2$ are all being reduced proportionally while the voltage across the diode 100 is arranged to be zero through proper scaling of the positive voltage outputs of amplifiers 64 and 80. The voltage across resistor 109 then acts to bias the diode 100 so that it cannot conduct until the output voltage at amplifier 64 becomes greater than the voltage across 109. The diode 100 is therefore ineffective for altitude reductions.

If the altitude increases, then the voltage $e_2$ is proportionally smaller than the output voltage of the amplifier 64. The voltage $e_2$ applying a positive potential at line 82 forces a current through conductor 117, resistors 108 and 109 to ground through conductor 111 and returning to the negative conductor 82A of the amplifier 80 so as to cause a voltage across resistor 109 which is now less than the positive output voltage of amplifier 64 applied to conductor 68 so that the diode 100 conducts a flow of current from conductors 68 and 104 to point 107 and through resistor 109 to ground so as to reduce the voltage at the input 68 to amplifier 66 to the value it had just before the voltage of the altitude signal $H_{RA}$ increased. The diode 100 thereupon acts to clamp the voltage output of amplifier 64 which is designed to have a relatively high output impedance. The voltage is clamped only if it increases above its previous value. Once the diode 100 clamps the output of amplifier 64, then the output of amplifier 66 is also effectively held at the same level. The forces the capacitor 92 to retain its positive charge, and to "remember" the last lowest altitude. If the altitude signal $H_{RA}$ again decreases below the previous low value, then the diode 100 ceases to conduct since the voltage across resistor 109 is larger than the voltage output of amplifier 64 and the diode 100 is so arranged as to prevent a reverse flow of current from point 107 to conductors 104 and 68. In this case, the voltage output of amplifier 66 is also reduced in accordance with the decrease in the altitude and thus in the signal $H_{RA}$ thereby causing the capacitor 92 to discharge through the diode 84 and resistor 74 as well as resistor 85 under normal rates of decrease of $e_1$ or through resistor 85 alone under more rapid rates of decrease of $e_1$, as heretofore explained, and to reduce the voltage $e_2$ accordingly. If the altitude increases again, effecting an increase in the altitude signal $H_{RA}$, the operation is as heretofore described.

OPERATION

Thus, as the radio altitude signal $H_{RA}$ applied to the input conductor 59 is reduced during the normal approach of the aircraft over a flat terrain to the runway, the limiter 62 will be set to approximately the same voltage as that provided at the input conductor 59 by the radio altimeter 52. If the terrain is uneven, and if there is a momentary increase in the radio altitude signal, as may result, for example, upon the aircraft flying over a valley, the output of the limiter 62 will be prevented from following the increased direct current altitude signal effected by the radio altimeter across the lines 55–59 to the amplitude control circuit 50. This inhibiting effect may be partial or complete depending upon the setting of the limiter 62.

On the other hand, if the aircraft were to pass over a hill, the altitude signal supplied by the radio altimeter 52 to the input line 59 would momentarily decrease more rapidly. The output voltage $e_1$ applied then to the output conductor 70 of the limiter 62 would in this case be less than the previously indicated altitude signal, but the lag circuit 70, 74, 78, 84, 85, 90, 91, 92 and 94 of the filter 72 would in this case follow this reduction in altitude only within the preset rate limits provided by such circuit of the filter 72.

Thus, it will be seen that increases in the sensed altitude may be partially or completely rejected by the amplitude control circuit 50 depending upon the setting of the limiter 62, while effects of rapid reduction in altitude would be greatly attenuated at the output conductor 82 by the lag and rate limiter circuit 70, 74, 78, 84, 85, 90, 91, 92 and 94 of the filter circuit 72. Inasmuch as the normal rate of altitude descent of conventional aircraft is, for example, about ten feet per second, the preset rate of descent limit provided by the filter circuit 72 may be set to, for example, about thirty feet per second to provide reasonable synchronization and reset time intervals.

In the event that the output signal $e_2$ at the output conductor 82 from the filter circuit 72 is at a low voltage at the beginning of an approach to a landing operation, the switch 112 has been provided so that the pilot may selectively adjust the switch 112 to close the switch contact 114 and apply to the limit circuit 62 a direct current biasing voltage provided from the battery 120 to reset the output $e_2$ at the conductor 82 to a desired high altitude condition immediately prior to beginning the approach of the aircraft to the landing operation.

Thus, the pilot operates the switch 112 to close the contact 114 to condition the amplitude control circuit 50 so that the radio altimeter signal $H_{RA}$ applied to the input conductor 59 may reset the output signal $e_2$ at the conductor 82 to the desired value at the beginning of the approach descent.

Immediately upon the approach descent being initiated, the switch 112 is positioned by the pilot so as to open the contact 114 and close switch contact 115, whereupon the feedback signal $e_2$ applied through the conductor 117 is effective to automatically set the limiter 62 through the action of the setting circuit 73 including the resistors 108 and 109 and the diode 100, as heretofore explained.

The comparator 132 is a conventional monitor unit which may include suitable threshold, lag and biasing circuitry to control a suitable relay device not shown and effective through output conductors 160 to initiate operation of a suitable warning indicator 162 upon the output of the conductor 82 failing to follow reductions in the radio altitude signal applied at the input 59 within predetermined safe operating limits. The warning indicator 162 may be a visual indicator such as a light, an audible indicator such as a siren, or a mechanical indicator such as a flag, all of which are of a type well known in the art.

If a failure to follow the decreasing altitude signal is detected, as upon the algebraic sum of the signals applied through the resistors 128 and 134 being equal to a predetermined differential value, the warning device 162 is rendered effective to alert the pilot of the aircraft to such condition.

Although only one embodiment of the invention has been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. An amplitude control network comprising:

first amplifying means having input and output means;

second amplifying means having input and output means;

first means connecting the output means of the first amplifying means to the input means of the second amplifying means;

third amplifying means having input and output means;

second means connecting the output means of the second amplifying means to the input means of the third amplifying means, said second connecting means including a first resistor and a first control device serially connected between the output means of the second amplifying means and the input means of the third amplifying means, said first control device normally conducting a flow of signal current in one sense relative to said first resistor;

a second resistor and a signal source serially connected across the input means of the third amplifying means, the signal from said signal source biasing the flow of current in the one sense relative to said first resistor and first control device and through said second resistor;

a capacitor connected across the serial connection of the second resistor and the signal source and charging upon a change in one sense in the flow of current relative to said first resistor and first control device and discharging upon a change in an opposite sense in the flow of current relative to said first resistor and first control device for effecting a time lag between a change in voltage at the input of said first amplifying means and a resulting voltage at the output means of said third amplifying means;

said first control device and capacitor arranged for permitting a reverse current discharge from the capacitor to be affected through the first and second resistors and first control device at a relatively rapid rate upon a relatively slight change in the current in said opposite sense, and said first control device preventing said discharge in the capacitor from being affected through said first control device and first resistor upon a relatively large change in the current in said opposite sense so that said discharge of the capacitor may then be effected only through said first resistor and at a relatively slow rate;

third and fourth resistors serially connected to the output means of the third amplifying means and to the input means of the first amplifying means;

a second control device having a unidirectional current conduction characteristic, said second control device being connected in parallel with said third and fourth resistors at a point intermediate said resistors and the output means of the third amplifier means and connected to the means for connecting the output means of the first amplifying means to the input means of the second amplifying means; and said second control device being responsive to a difference in voltages at said connecting points to limit the effect of changes in one sense in the voltage at the input of said first amplifying means on the output voltage at the output means of said third amplifying means while permitting the output voltage at the output means of said third amplifying means to be varied in accordance with changes in an opposite sense in the signal voltage at the input means of said first amplifying means.

2. A system including means for providing an input signal and a network for controlling the amplitude of the input signal, said network comprising:
   a limiter for limiting the input signal and including first amplifier means having an input connected to the input signal means and an output;
   filter means including second amplifier means having an input connected to the output of the first amplifier means and a output at which a output signal is provided;
   feedback means connected to the output of the second amplifier means and to the input of the first amplifier means;
   a limit controlling circuit including a resistor connected by the feedback means to the output of the second amplifier means and a unidirectional current flow control device connected to the resistor and connected to ground, said control device connected to the input of the first amplifier means and responsive to a difference in voltages at the first amplifier means input and across said resistor means and ground for preventing the signal at said input from acting in one sense to exceed a predetermined differential in relation to the voltage across said resistor means and ground for limiting the output signal from acting in one sense while permitting the output signal to be varied in an opposite sense in accordance with changes in the input signal acting in the opposite sense;
   means for providing a biasing voltage;
   switching means connected to the biasing voltage means and connecting the feedback means to the limit controlling circuit;
   said switching means being selectively operable for disconnecting the feedback means from the limit controlling circuit and for connecting the biasing voltage means thereto; and
   the limit controlling circuit being responsive to the biasing voltage applied through said switching means for controlling the limit of the limiter to a predetermined input signal condition.

3. A network as defined by claim 2, wherein the filter means further includes:
   a first resistor and a current flow control device serially connected intermediate the limiter and the input of the second amplifier means, and said current flow control device arranged to normally conduct a flow of current in one sense relative to the first resistor and the amplifier input;
   a signal source and a second resistor serially connected to the input of the second amplifier means and arranged to bias said flow of current in said one sense relative to said first resistor and control device and through said second resistor;
   a capacitor connected across the series connection of the signal source and the second resistor and charged upon a change in one sense in the flow of current relative to the first resistor and control device, and discharged upon a change in an opposite sense in the flow of current relative to said first resistor and control device, and for affecting a time lag between a change in the current applied to said filter means and a corresponding change in a resulting current applied at the output of said second amplifier; and
   said control device being arranged with said first and second resistors and said capacitor to permit a reverse current discharge from the capacitor to be affected through said first and second resistors and control device at a relatively rapid rate upon a relatively slight change in the signal current in said opposite sense, and said control device preventing said discharge in the capacitor being effected through said control device and first resistor upon a relatively large change in the current in said opposite sense so that said discharge of the capacitor may then be effected only through said second resistor and at a relatively slow rate.

References Cited

UNITED STATES PATENTS 3,173,095    3/1965    Wagner _____ 328—169 X

NATHAN KAUFMAN, Primary Examiner

U.S. Cl. X.R.

330—51, 98